Patented Sept. 17, 1929

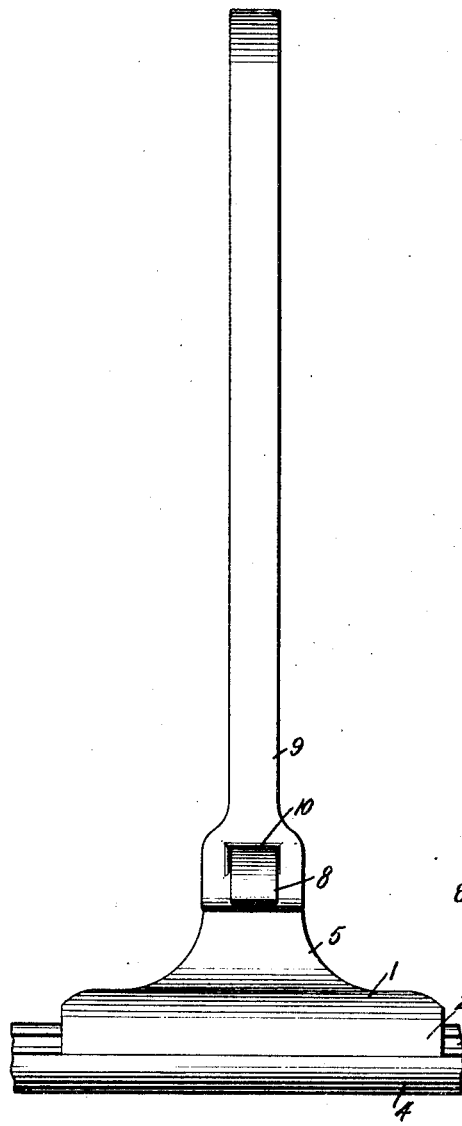
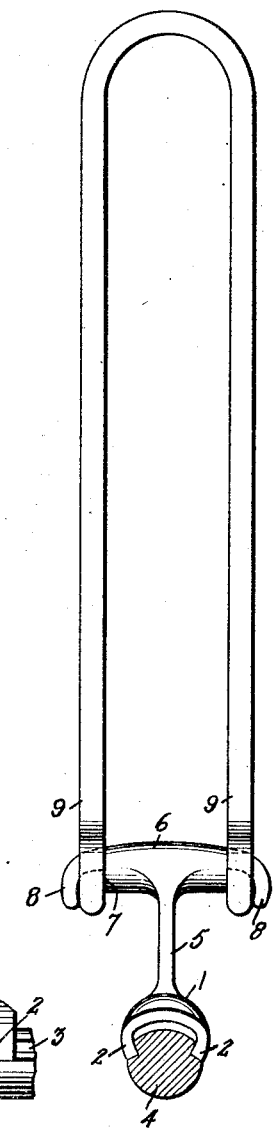
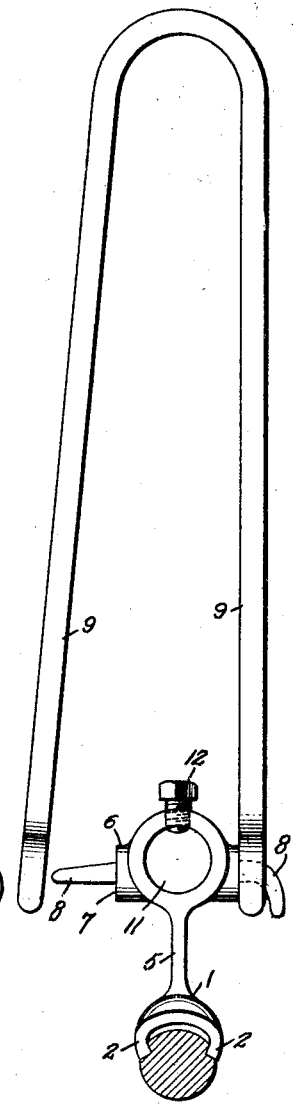

1,728,820

UNITED STATES PATENT OFFICE

GEORGE W. BOWER, OF WESLEYVILLE, PENNSYLVANIA, ASSIGNOR TO GENERAL ELECTRIC COMPANY, A CORPORATION OF NEW YORK

TROLLEY-WIRE SUSPENSION

Application filed October 23, 1928. Serial No. 314,472.

The present invention relates to the suspension of overhead trolley wires and more especially to the catenary type of suspension.

The object of my invention is the provision of an improved combined trolley wire ear and hanger for use on catenary systems of suspension, which shall be capable of installation with facility and without the use of special tools, and which shall be of low cost of manufacture.

An embodiment of the invention is shown in the accompanying drawing, in which Fig. 1 is a side elevation of a combined hanger and ear with a short section of trolley wire attached; Fig. 2 is an end elevation thereof, and Fig. 3 is an end elevation showing the ear modified for the reception of a current tap and with one of the legs of the hanger detached therefrom.

As shown in the drawing, the ear comprises a wire-engaging portion 1 of trough shape, the lower edges or jaws 2 of which are designed to be bent inwardly into clamping engagement with the grooves 3 of the customary trolley wire 4. Extending upwardly from the center of the wire-engaging portion is a longitudinal web 5 having at its upper end a transverse head 6, the ends of which have vertical shoulders 7 and rectangular lugs or tongues 8.

The hanger is in the form of a U-shaped loop adapted to be installed astride the catenary suspension cable with the ends of its legs 9 somewhat enlarged and provided with rectangular apertures 10 for the reception therein of the lugs or tongues 8 of the ear. It will be understood that the length of the hanger will vary according to the location in which it is installed on the catenary cable.

As shown in Fig. 3, the transverse head 6 of the ear is provided with a bore 11 parallel to the wire-engaging portion 1 and of a size readily to receive an ordinary feeder tap, and in the wall above the bore is a set screw 12 for clamping the feeder tap in electrical contact therewith.

To install my combined hanger and ear, the latter is clamped to the trolley wire at the desired point of suspension, the hanger placed astride the suspension catenary cable and the ends of its legs 9 threaded over the lugs or tongues 8 and the latter clenched, as shown in Fig. 2, by a rap of a hammer. Where it is desirable that the hanger and ear be connected before installation, one of the hanger legs 9 is clenched to the ear, as indicated in Fig. 3, and after installation the free leg 9 connected to the ear.

While I have shown and described herein the best embodiment of the invention known to me, I do not desire to be restricted thereto.

What I claim as new and desire to secure by Letters Patent of the United States, is:

1. A trolley wire suspension comprising a U-shaped hanger, the legs of which are transversely apertured, and a trolley wire engaging ear provided with a cross head having lugs or tongues for interengaging with the apertures of said hanger legs.

2. A trolley wire suspension comprising a U-shaped hanger, the legs of which are provided with rectangular apertures in the ends thereof, and a trolley wire engaging ear provided with a cross head having at its ends vertical shoulders and rectangular lugs or tongues for interengaging with the apertures of said hanger legs.

3. A trolley wire suspension comprising a U-shaped hanger, the legs of which are transversely apertured, and a trolley wire engaging ear provided with a cross head having a wire-receiving bore centrally thereof and at its ends lugs or tongues for interengaging with said hanger legs.

In witness whereof, I have hereunto set my hand this 18th day of October 1928.

GEORGE W. BOWER.